(12) United States Patent
Young

(10) Patent No.: US 6,761,500 B2
(45) Date of Patent: Jul. 13, 2004

(54) CONNECTOR

(76) Inventor: Ronald Alexander Young, 95 Mushroom Green, Dudley Wood, West Midlands (GB), DY2 0EE (*) Notice: Subject to any disclaimer, the term of this patent is extended or adjusted under 35 U.S.C. 154(b) by 92 days.

(21) Appl. No.: 10/057,931

(22) Filed: Jan. 29, 2002

(65) Prior Publication Data

US 2002/0164195 A1 Nov. 7, 2002

(30) Foreign Application Priority Data

May 4, 2001 (GB) .............................................. 0110950

(51) Int. Cl.[7] .............................................. B25G 3/30
(52) U.S. Cl. ........................ 403/24; 403/343; 403/192; 403/306; 403/299; 403/287
(58) Field of Search ................................ 403/287, 343, 403/192, 361, 299, 334, 333, 194, 306, 307, 308

(56) References Cited

U.S. PATENT DOCUMENTS 5,297,887 A * 3/1994 Williams .................... 403/299
5,366,314 A * 11/1994 Young ........................ 403/299
5,385,420 A * 1/1995 Newman et al. ............ 403/299
5,940,933 A   8/1999 Chang

FOREIGN PATENT DOCUMENTS

| GB | 224756 | 11/1924 |
|----|--------|---------|
| GB | 2 063 140 | 6/1981 |
| GB | 2 262 255 | 6/1993 |

* cited by examiner

Primary Examiner—John R. Cottingham
(74) Attorney, Agent, or Firm—Young & Thompson

(57) ABSTRACT

A connector includes first and second engagable components for mounting on an implement and a handle. The first component has a boss formed with an internal socket and an outer peripheral surface surrounding the socket, and the second component includes an insert member, a sleeve member which is independent of the insert member, and parts for interengaging the insert and sleeve members when the insert member is received in the sleeve member. The insert member has an insert portion engagable within an opening in the end of the handle and a spigot portion adapted to fit within the internal socket of the boss. The sleeve member has a first portion engagable with the external surface of the end of the handle, and a second portion engagable with the outer peripheral surface of the first component.

20 Claims, 3 Drawing Sheets

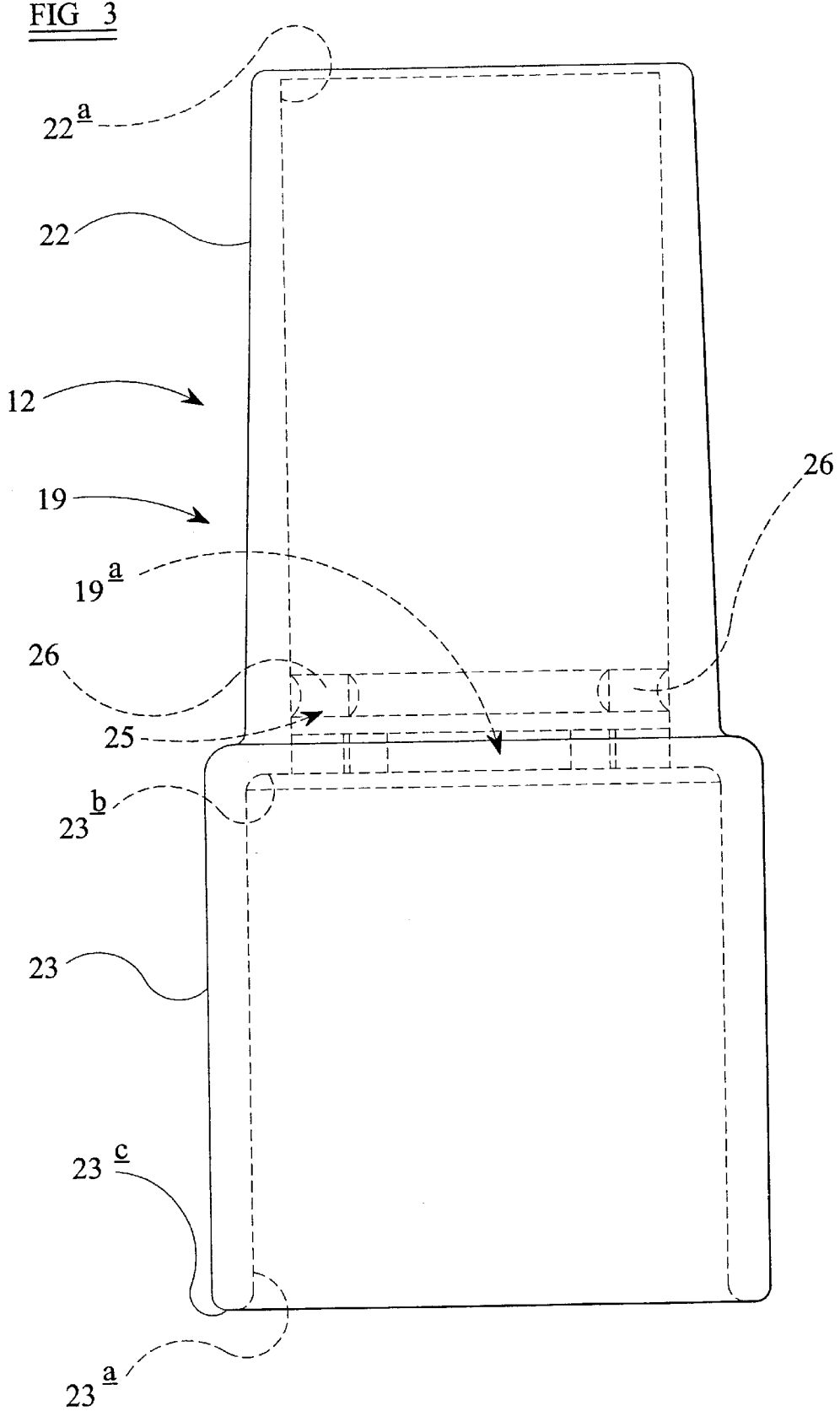

CONNECTOR

This invention relates to a connector for connecting an implement to a handle and/or shaft.

BACKGROUND OF THE INVENTION

It is often desirable that a connector for connecting a handle and/or shaft to an implement should be detachable. Not only can this facilitate packaging and storage, but it enables a supplier to keep a stock of similar handles/shafts which may be supplied for use with a variety of different implements, according to demand. Also, a user may then require only a single handle/shaft which may be used interchangably with a whole range of different implements. Detachable connectors often therefore comprise two engagable components, one component for mounting on a handle/shaft and the other for mounting on the implement.

In one common form of connector, the component for mounting on the handle/shaft comprises an externally threaded spigot which may be screwed into an integrally threaded socket on a second component for mounting on the implement. For cheapness and ease of manufacture, the components are often formed from plastics.

While such connectors are very suitable for implements which have only comparatively light use, it is sometimes found, particularly with cleaning implements which undergo heavy industrial use, that the connectors can fail. With time, the engagement between the threaded spigot and the socket may loosen, or the weight of the implement, or the heavy use to which it is subjected, may result in the threaded spigot bending or even snapping. This may be particularly liable to occur if the handle/shaft is to be used interchangeably with a whole range of implements, since the repeated connection and disconnecting can cause rapid failure of conventional screwed connectors.

The present invention seeks to overcome this problem.

SUMMARY OF THE INVENTION

According to the present invention, there is provided a connector comprising first and second engagable components for mounting on an implement and a handle and/or shaft, respectively, the first component having a boss formed with an internal socket and an outer peripheral surface surrounding the socket, and the second component comprising an insert member, a sleeve member which is independent of the insert member, and means for interengaging the insert and sleeve members when the insert member is received in the sleeve member, the insert member having an insert portion engagable within an opening in the end of the handle and/or shaft and a spigot portion adapted to fit within the internal socket of the boss, the sleeve member having a first portion engagable with the external surface of the end of the handle and/or shaft, and a second portion engagable with the outer peripheral surface of the first component.

The present invention will now be described, by way of example, with reference to the accompanying drawings.

BRIEF DESCRIPTION OF THE DRAWINGS

FIG. 3 is a side view of another part of the second component of the connector on an enlarged scale.

DETAILED DESCRIPTION OF THE PREFERRED EMBODIMENT

Figure 1:
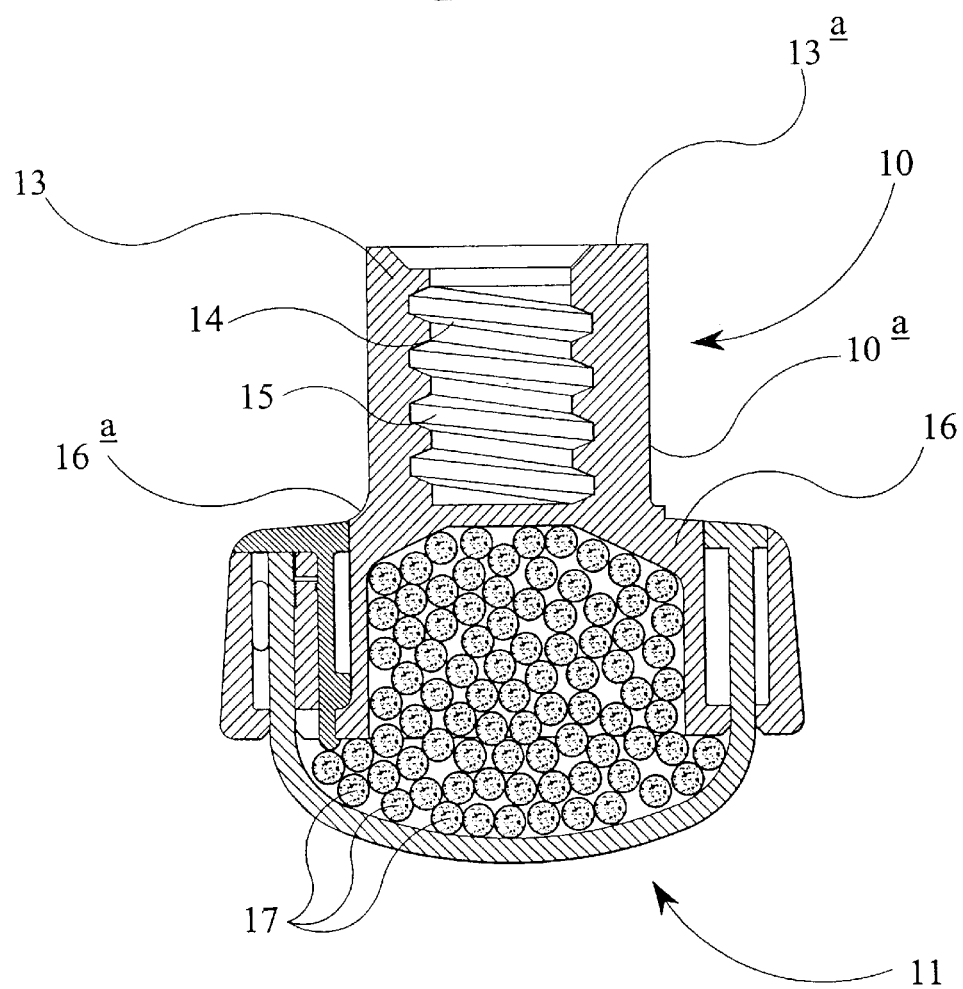
FIG. 1 is a cross-sectional view of a first component of one embodiment of a connector, in accordance with the present invention.
Figure 2:
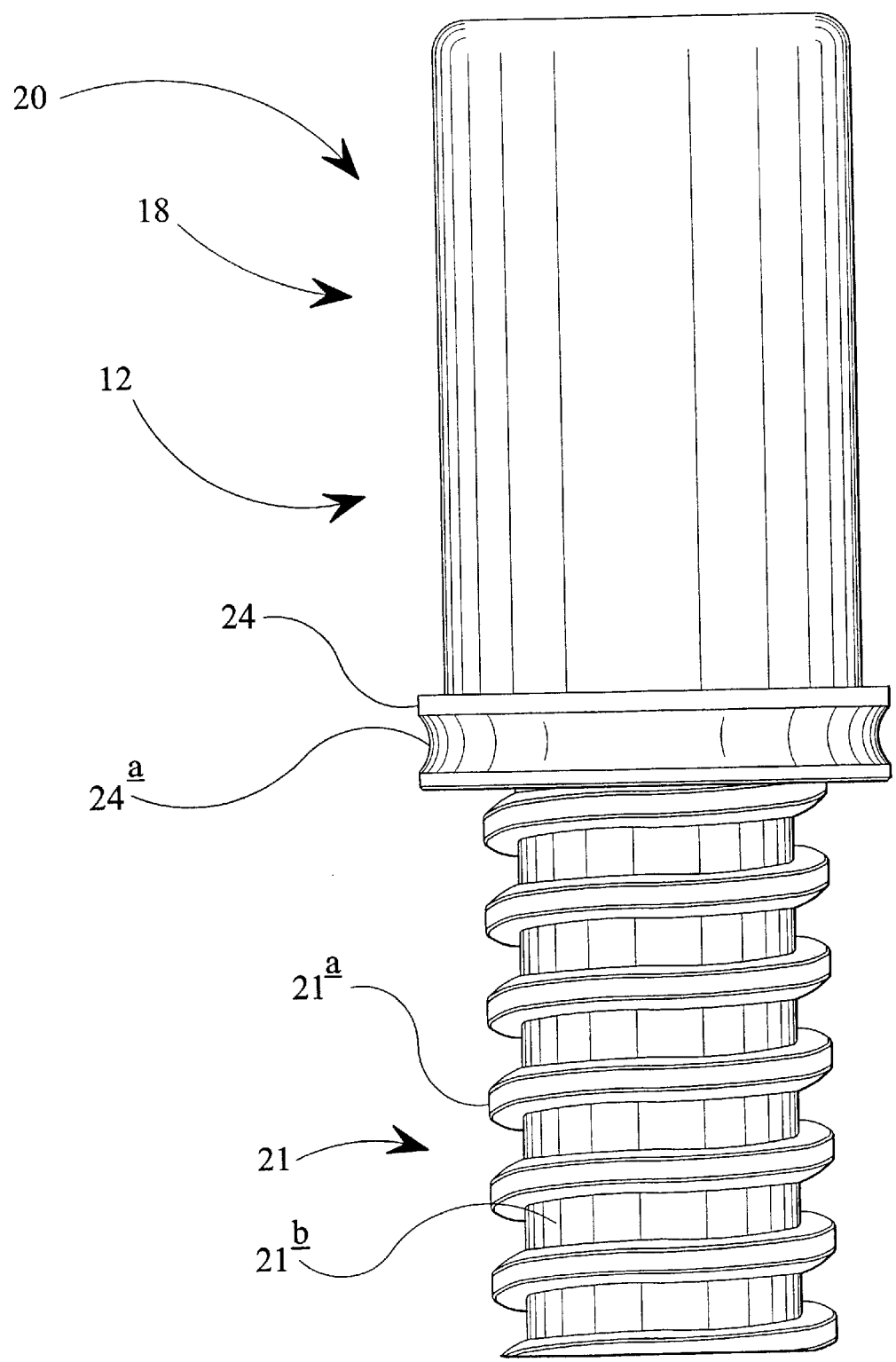
FIG. 2 is a side view of a part of a second component of the connector on an enlarged scale.

Referring to the drawings, a connector, which is typically formed from plastics, is shown therein and comprises a first component 10 adapted for mounting on an implement, in this case a head 11 of a floor mop, and a second component 12 for mounting on a handle and/or shaft, in this case an elongate handle of the mop (not shown).

The first component 10 has a boss 13 formed with an internal socket 14 which is internally screw-threaded as indicated at 15. The boss 13 is integrally formed with a body 16 of the mophead 11 which may, for example, support a bundle of flexible elongate elements or 'strands' 17.

The second component 12 comprises an insert member 18, a sleeve member 19 which is independent of the insert member 18, and means for interengaging the insert and sleeve members 18 and 19 when the insert member 18 is received in the sleeve member 19.

The insert member 18 comprises an insert portion 20 and a spigot portion 21. The insert portion 20 is engagable, typically as an interference fit, riveting and/or dimpling, within an opening in the end of the mop handle.

The spigot portion 21 has an external screw-thread 21a formed around its core 21b. The external screw-thread 21a has the same pitch as the internal screw-thread 15 of the internal socket 14 of the boss 13.

The sleeve member 19 comprises two portions 22 and 23. The first portion 22 is engagable with the end of the mop handle in which the opening is formed. The first portion 22 is dimensioned to provide a friction fit between its inner surface 22a and the external surface (not shown) of the end of the mop handle.

The second portion 23 of the sleeve member 19 is engagable with the outer peripheral surface 10a of the first component 10. The second portion 23 is dimensioned so that this engagement is in the form of a friction fit.

The inner surface 23a of the second portion 23 may be tapered to provide a gradually increasing friction fit as the boss 13 is inserted. The inner surface 23a also includes an inwardly projecting shoulder 23b on which the leading edge 13a of the boss 13 can, in use, abut.

Axially extending elongate ribs (not shown) may be provided on the inner surface 23a of the second portion 23 or the outer peripheral surface 10a of the first component 10, typically around the boss 13, to promote engagement.

In this embodiment, the internal diameter of the second portion 23 is greater than the internal diameter of the first portion 22. However, these diameters are dictated by the dimensions of the boss 13 and the handle/shaft to be used.

An opening 19a is formed between the first and second parts 22 and 23 of the sleeve member 19. The opening 19a is dimensioned to enable only the spigot portion 21 of the insert member 18 to pass therethrough.

The interengagement means includes a first part 24 formed between the insert portion 20 and the spigot portion 21 of the insert member 18, and a second part 25 formed as part of the inner surface 22a of the first portion 22 of the sleeve member 19 at the end of the inner surface 22a adjacent to the second portion 23.

In this embodiment, the second part 25 of the interengagement means is in the form of a plurality of coplanar ribs 26 which are circumferentially spaced and of convex cross-sectional shape. However, the second part 25 could take the form of a single annular rib.

The first and second parts 24 and 25 are adapted to be snap-fittably engaged with one another. As such, the first part 24 is formed with an annular recess 24a of concave cross-sectional shape. The ribs 26 and the recess 24a are of complementary shape. The interengaging means is also releasable, and the convex/concave shape of the first and second parts 24 and 25 facilitates their separation.

In use, the insert portion 20 of the insert member 18 is pushed into the opening in the end of the mop handle, and then further fixed in place if necessary. With the first portion 22 leading, the sleeve member 19 is then slid over the spigot portion 21 of the insert member 18 onto the end of the mop handle with sufficient force to overcome the friction fit between the outer surface of the mop handle and the inner surface 22a of the first portion 22 and until the first and second parts 24 and 25 of the interengagement means snap-fittably engage.

In this state, the spigot portion 21 of the insert member 18 is completely received within the second portion 23 of the sleeve member 19.

The first and second components 10 and 12 are then offered together. The spigot portion 21 is screw-threadingly engaged with the internal socket 14 of the boss 13, causing the second portion 23 of the sleeve member 19 to be drawn over the boss 13 and engage with the outer peripheral surface 10a of the first component 10. The spigot portion 21 of the insert member 18 is wound into the internal socket 14 of the boss 13 until the leading edge 23c of the second portion 23 of the sleeve member 19 abuts the top surface 16a of the body 16 of the mophead 11 and/or until the leading edge 13a of the boss 13 abuts the shoulder 23b of the second portion 23. In this state, the insert member 18, sleeve member 19 and the boss 13 are all coaxially aligned with each other.

It will be appreciated that the boss 13 is not limited to being formed as part of a mophead, and may be formed as part of any suitable implement, such as a brush-head, for mounting to a handle and/or shaft.

Mating screw-threads may be formed in the outer peripheral surface 10a of the first component 10 surrounding the boss 13 and around the internal surface 23a of the second portion 23 of the sleeve member 19, in addition to or instead of the screw-threads 15 and 21a.

It is thus possible to provide a connector having independent parts which, in use, significantly strengthen the joint between a handle/shaft and an interchangeable implement.

The embodiment described above is given by way of example only and various modifications will be apparent to persons skilled in the art without departing from the scope of the invention.

What is claimed is:

1. A connector comprising:
   first and second engagable components for mounting on an implement and a handle
   the first component having a boss formed with an internal socket and an outer peripheral surface surrounding the socket, and
   the second component comprising an insert member, a sleeve member which is independent of the insert member, and means for interengaging the insert and sleeve members when the insert member is received in the sleeve member,
   the insert member having an insert portion engagable within an opening in an end of the handle, and a spigot portion adapted to fit within the internal socket of the boss,
   the sleeve member having a first portion engagable with an external surface of the end of the handle, and a second portion engagable with an outer peripheral surface of the first component.

2. A connector as claimed in claim 1, wherein the interengaging means comprises a first part positioned between the insert portion and the spigot portion of the insert member, and a second part positioned between the first and second portions of the sleeve member.

3. A connector as claimed in claim 1, wherein the interengaging means is snap-fittably interengagable.

4. A connector as claimed in claim 1, wherein the interengaging means is releasable to enable the insert member and the sleeve member to be separated.

5. A connector as claimed in claim 1, wherein the spigot portion of the insert member is screw-threadably engagable with the internal socket of the boss.

6. A connector as claimed in claim 1, wherein the first portion of the sleeve member is dimensioned to frictionally engage the external surface of the end of the handle.

7. A connector as claimed in claim 1, wherein the second portion of the sleeve member is dimensioned to frictionally engage the outer peripheral surface of the first component.

8. A connector as claimed in claim 7, wherein the second portion of the sleeve member is tapered to increase the frictional engagement between the sleeve member and the first component as the boss of the first component is inserted into the sleeve member.

9. A connector as claimed in claim 1, wherein, in use, the insert member, sleeve member and internal socket of the boss are coaxially aligned.

10. A connector as claimed in claim 1, wherein the first component is attached to a mophead.

11. A connector as claimed in claim 1, wherein the first component is attached to a brush-head.

12. A connector for connecting a cleaning implement to a handle, comprising:
    a first component mounting a cleaning implement body and having an outer peripheral surface;
    a boss having an internal socket formed on one end of the first component, the internal socket having an internal screw-thread;
    a cleaning implement body integrally formed to the boss;
    a second component comprising an insert member receivable in a sleeve member,
    the insert member comprising
       an insert portion engagable within an opening in a first end of a handle, and
       a spigot portion with an external screw-thread, the external screw-thread of the spigot portion having a same pitch as a pitch of the internal screw-thread of the internal socket of the boss;
    the sleeve member comprising a first portion and a second portion connected to the first portion,
    the first portion engagable with the first end of the handle,
    the second portion engagable with the outer peripheral surface of the first component; and
    an opening located intermediate the first portion and the second portion, the opening sized to permit the spigot portion of the insert member to pass therethrough for engaging the exterior screw-thread of the spigot portion with the interior screw-thread of the first component.

13. The connector of claim 12, wherein,
    the cleaning implement body comprises bundles of flexible elongate strands and forms a mophead.

14. The connector of claim 13, wherein, the first portion is engagable with the first end of the handle by friction fit, and the second portion engagable with the outer peripheral surface of the first component by friction fit.

15. The connector of claim 12, wherein, the insert member further comprises a concave ring separating the spigot portion from the insert portion; and the sleeve member further comprising a circular rib separating the first portion and the second portion, the concave ring and circular rib sized for being snap-fit together.

16. A connector for connecting a cleaning implement to a handle, comprising:

a first component for mounting a cleaning implement body, the first component comprising
 a boss having an internal socket formed on a first end of the first component, the internal socket having an internal screw-thread,
 an outer peripheral surface around the boss, and
 connections to a cleaning implement body formed on a second end of the first component; and a second component comprising an insert member receivable in a sleeve member,
 the insert member comprising an insert portion connected to a spigot portion,
 the insert portion engagable within an opening in a first end of a handle, and
 the spigot portion with an external screw-thread, the external screw-thread of the spigot portion,
 the sleeve member comprising a first portion, a second portion connected to the first portion, and a through-hole located intermediate the first portion and the second portion,
 the first portion engagable with the first end of the handle,
 the second portion engagable with the outer peripheral surface around the boss, and
 the opening sized to permit the spigot portion of the insert member to pass therethrough for engaging the exterior screw-thread of the spigot portion with the interior screw-thread of the internal socket.

17. The connector of claim 16, wherein, the connections to the cleaning implement body formed on a second end of the first component integrally form integral form the cleaning implement body to the boss.

18. The connector of claim 17, wherein the cleaning implement body comprises bundles of flexible elongate strands and forms a mophead.

19. The connector of claim 16, wherein, the first portion is engagable with the first end by friction fit, and the second portion engagable with the outer peripheral surface by friction fit.

20. The connector of claim 16, wherein, the insert member further comprises a concave ring separating the spigot portion from the insert portion; and the sleeve member further comprising a circular rib separating the first portion and the second portion, the concave ring and circular rib sized for being snap-fit together.

* * * * *